US009682445B1

(12) United States Patent
Chou et al.

(10) Patent No.: US 9,682,445 B1
(45) Date of Patent: Jun. 20, 2017

(54) DIFFUSION-BONDED METALLIC MATERIALS

(71) Applicants: Kathleen Chou, St. Louis, MO (US); Kevin T. Slattery, St. Charles, MO (US)

(72) Inventors: Kathleen Chou, St. Louis, MO (US); Kevin T. Slattery, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/043,231

(22) Filed: Feb. 12, 2016

(51) Int. Cl.
| | |
|---|---|
| *B23K 31/02* | (2006.01) |
| *B23K 20/02* | (2006.01) |
| *B23K 35/34* | (2006.01) |
| *B23K 35/02* | (2006.01) |

(52) U.S. Cl.
CPC .............. *B23K 31/02* (2013.01); *B23K 20/02* (2013.01); *B23K 20/026* (2013.01); *B23K 35/025* (2013.01); *B23K 35/34* (2013.01)

(58) Field of Classification Search
CPC ... B23K 35/0244–35/025; B23K 20/02; B23K 20/001; B23K 20/04; B23K 20/026; B23K 2203/10; B23K 2203/15
USPC .......................... 228/193–195, 248.1–248.5, 228/262.71–262.72, 262.5–262.51
See application file for complete search history.

(56) References Cited

U.S. PATENT DOCUMENTS

| | | | |
|---|---|---|---|
| 4,890,784 A | 1/1990 | Bampton | |
| 4,905,886 A | 3/1990 | Kennedy et al. | |
| 4,948,457 A | 8/1990 | Cooper et al. | |
| 5,224,645 A | 7/1993 | Cooper et al. | |
| 2004/0262367 A1* | 12/2004 | Nakamura | H01L 23/3735 228/122.1 |
| 2006/0219756 A1* | 10/2006 | Tada | B23K 35/0244 228/101 |
| 2013/0236738 A1* | 9/2013 | Yamauchi | C04B 41/009 428/632 |
| 2014/0126155 A1* | 5/2014 | Imamura | B23K 35/3006 361/715 |
| 2015/0208496 A1* | 7/2015 | Terasaki | B23K 35/30 361/760 |

(Continued)

FOREIGN PATENT DOCUMENTS

| | | | | |
|---|---|---|---|---|
| EP | 0574115 A2 | 12/1993 | | |
| GB | 980622 A | * | 1/1965 | ......... B23K 35/0244 |

OTHER PUBLICATIONS

Zhang, J., et al., "An investigation on diffusion bonding of aluminum and magnesium using Ni interlayer," Materials Letters, Jun. 9, 2012, vol. 83, Elsevier, Amsterdam, The Netherlands, pp. 189-191.

(Continued)

*Primary Examiner* — Kiley Stoner
(74) *Attorney, Agent, or Firm* — Toler Law Group, PC (57) ABSTRACT

A method includes disposing $ZrH_2$ nanoparticles on a first metallic material. The method includes performing a diffusion bonding operation to bond the first metallic material to a second metallic material. At least one of the first metallic material or the second metallic material includes a surface oxide layer. During the diffusion bonding operation, the $ZrH_2$ nanoparticles chemically react with the surface oxide layer.

20 Claims, 4 Drawing Sheets

(56) References Cited

U.S. PATENT DOCUMENTS

2015/0313011 A1\* 10/2015 Terasaki .................. H05K 1/02
                                                          428/336

OTHER PUBLICATIONS

Sunwoo, A., "Diffusion Bonding of Aluminum Alloy, 8090" Scripta Metallurgica et Materialia, 1994, vol. 31, No. 4, Elsevier Science, Ltd., Amsterdam, The Netherlands, pp. 407-412.
Yan, H., et al., "Diffusion Bonding of Superplastic 7075 Aluminum Alloy," Materials Research Society Symposium Procedures, Jan. 1990, vol. 196, downloaded from http:/www.dx.doi.org/10.1557/Proc-196-149, pp. 149-154.

\* cited by examiner

DIFFUSION-BONDED METALLIC MATERIALS

FIELD OF THE DISCLOSURE

The present disclosure is generally related to diffusion-bonded metallic materials.

BACKGROUND

Diffusion bonding is a technique which involves pressing together components under heat to induce atomic diffusion and produce a metal bond. Some metallic materials (e.g., aluminum alloys) have a tenacious surface oxide that forms rapidly at low partial pressures of oxygen. Such surface oxide layers may be difficult to remove (e.g., via chemical and/or mechanical means). The rapid formation of surface oxide layers may make diffusion bonding of such metallic materials impractical.

SUMMARY

In a particular embodiment, a method includes disposing zirconium hydride ($ZrH_2$) nanoparticles on a first metallic material. The method includes performing a diffusion bonding operation to bond the first metallic material to a second metallic material. At least one of the first metallic material or the second metallic material includes a surface oxide layer. During the diffusion bonding operation, the $ZrH_2$ nanoparticles chemically react with the surface oxide layer.

In another particular embodiment, a diffusion-bonded metallic material is disclosed. The diffusion-bonded metallic material is formed by a process that includes disposing $ZrH_2$ nanoparticles on a first metallic material and performing a diffusion bonding operation to bond the first metallic material to the second metallic material. At least one of the first metallic material or the second metallic material includes a surface oxide layer. During the diffusion bonding operation, the $ZrH_2$ nanoparticles chemically react with the surface oxide layer.

In another particular embodiment, a diffusion-bonded metallic material is disclosed. The diffusion-bonded metallic material includes two metallic materials, a diffusion bond region disposed between the two metallic materials, and an oxidized region disposed between the two metallic materials. The diffusion bond region includes zirconium oxide and diffused metal atoms from the two metallic materials. The oxidized region includes metallic oxides of the two metallic materials. The oxidized region does not include zirconium oxide.

The features, functions, and advantages that have been described can be achieved independently in various embodiments or may be combined in other embodiments, further details of which are disclosed with reference to the following description and drawings.

DETAILED DESCRIPTION

The present disclosure describes diffusion-bonded metallic materials and processes of forming diffusion-bonded (DB) metallic materials. The present disclosure further describes diffusion-bonded/superplastically-formed (DB/SPF) metallic materials and processes of forming DB/SPF metallic materials.

In the present disclosure, zirconium hydride ($ZrH_2$) nanoparticles may be used to substantially break down a surface oxide layer on a surface of a metallic material in order to enable migration of metallic atoms during a diffusion bonding operation. Metallic materials, such as aluminum (Al), beryllium (Be), or magnesium (Mg) materials (among other materials, such as nickel-based materials, chromium-based materials, stainless steel materials, etc.), may be susceptible to formation of surface oxide layers that may prevent diffusion of metallic atoms between two metallic materials to be bonded. Chemical reaction of the $ZrH_2$ nanoparticles with the surface oxide layers (e.g., Al, Be, or Mg oxide layers) may enable migration of metal atoms (e.g., Al, Be, or Mg atoms) during the diffusion bonding operation. To illustrate, in the case of two aluminum materials (e.g., two aluminum or aluminum alloy sheets), the $ZrH_2$ nanoparticles may react with aluminum oxide layers formed on the surfaces of the aluminum materials to form zirconium oxide and aluminum metal, enabling diffusion bonding in locations where the $ZrH_2$ nanoparticles are applied. While the present disclosure describes the application of $ZrH_2$ nanoparticles, alternative materials that are able to chemically react with a passivation oxide layer in order to allow diffusion of metallic atoms may be utilized.

In some cases, the $ZrH_2$ nanoparticles (or a metallic powder, such as an aluminum powder or an aluminum alloy powder, that includes the $ZrH_2$ nanoparticles) may be selectively applied (e.g., cold sprayed, plasma sprayed, coated, or otherwise applied) to particular areas of the metallic materials to be bonded. Selective application of the $ZrH_2$ nanoparticles may enable the formation of diffusion-bonded region(s) in areas where the $ZrH_2$ nanoparticles are applied. Areas where the $ZrH_2$ nanoparticles are not applied may represent oxidized region(s) that, in some cases, may be shaped via a superplastic forming operation (e.g., to form a superplastic corrugation), resulting in a diffusion-bonded/ superplastically-formed (DB/SPF) metallic material.

Figure 1:
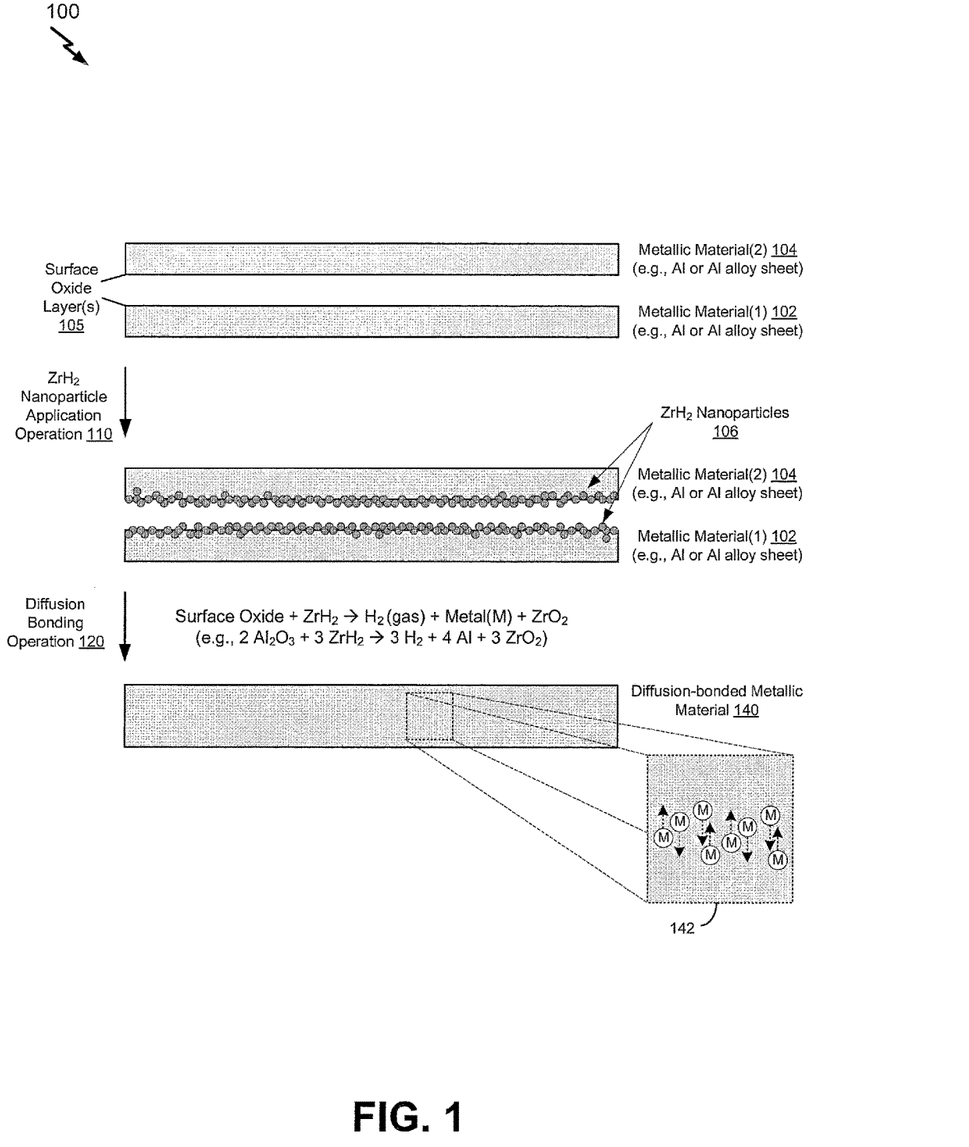
FIG. 1 is a diagram illustrating a process of forming a diffusion-bonded metallic material, according to one embodiment.

Referring to FIG. 1, a diagram 100 illustrates a particular embodiment of a process of forming a diffusion-bonded metallic material 140. In FIG. 1, a first metallic material 102 (identified as "Metallic Material(1)" in FIG. 1) is bonded to a second metallic material 104 (identified as "Metallic Material(2)" in FIG. 1) using $ZrH_2$ nanoparticles 106 that are applied to a surface of the first metallic material 102, to a surface of the second metallic material 104, or a combination thereof. The $ZrH_2$ nanoparticles 106 chemically react with surface oxide layer(s) 105 on one or both of the metallic materials 102, 104 to break down the surface oxide layer(s) 105 in order to enable diffusion of metal atoms between the metallic materials 102, 104. FIG. 1 illustrates an example in which the $ZrH_2$ nanoparticles 106 are coated onto both surfaces of the metallic materials 102, 104. In other cases, as illustrated and further described herein with respect to FIG. 2, the $ZrH_2$ nanoparticles 106 may be selectively applied to particular area(s) of the metallic material(s) 102, 104 (e.g., to form a DB/SPF metallic material).

FIG. 1 illustrates an example of a $ZrH_2$ nanoparticle application operation 110 in which the $ZrH_2$ nanoparticles 106 are disposed on the first metallic material 102, the second metallic material 104, or a combination thereof. In the example of FIG. 1, the $ZrH_2$ nanoparticles 106 are coated or applied on surfaces of both the first metallic material 102 and the second metallic material 104. In other cases, the $ZrH_2$ nanoparticles 106 may be selectively applied to a single one of the metallic materials 102, 104. In either case, FIG. 1 illustrates that the $ZrH_2$ nanoparticle application operation 110 results in the $ZrH_2$ nanoparticles 106 being disposed between the two metallic materials 102, 104. In a particular embodiment, the metallic materials 102, 104 include aluminum or aluminum alloy sheets (or materials that include different metals, such as an aluminum-containing material and an iron-containing material, such as steel), and the $ZrH_2$ nanoparticle application operation 110 includes disposing an aluminum alloy powder that includes the $ZrH_2$ nanoparticles 106 on the first metallic material 102 (and optionally the second metallic material 104). As used herein, the term "nanoparticle" refers to particles having a characteristic dimension (e.g., an average diameter) in a range of 1 nm to 100 nm.

A diffusion bonding operation 120 may be performed after the $ZrH_2$ nanoparticle application operation 110. The diffusion bonding operation 120 may include the application of heat in an inert atmosphere (e.g., an argon atmosphere). In some cases, the diffusion bonding operation 120 may be performed at a pressure that is less than an ambient pressure. At least one of the first metallic material 102 or the second metallic material 104 includes the surface oxide layer 105, and chemical reaction of the $ZrH_2$ nanoparticles 106 with the surface oxide layer(s) 105 breaks down at least portions of the surface oxide layer(s) 105, enabling migration of metal atoms during the diffusion bonding operation 120. As described further herein, in some cases, the metallic materials 102, 104 may include aluminum (or an aluminum alloy), beryllium (or a beryllium alloy), or magnesium (or a magnesium alloy), among other alternatives. In some cases, the metallic materials 102, 104 may have different metallic compositions. As an illustrative, non-limiting example, one of the metallic materials 102, 104 may be an aluminum-containing material and one of the metallic materials 102, 104 may be an iron-containing material, such as steel. Other examples may include an aluminum-containing material and a magnesium-containing material or a nickel-containing material and an iron-containing material (e.g., steel), among other alternatives. As illustrated in FIG. 1, the diffusion bonding operation 120 results in the formation of the diffusion-bonded metallic material 140 in which the first metallic material 102 is bonded to the second metallic material 104.

FIG. 1 depicts a non-limiting illustrative example in which at least one of the metallic materials 102, 104 includes aluminum (or an aluminum alloy), and the surface oxide layer(s) 105 include an aluminum oxide layer. In this example, a chemical reaction of the $ZrH_2$ nanoparticles 106 with the surface oxide layer(s) 105 breaks down at least a portion of the aluminum oxide layer(s), enabling migration of aluminum atoms during the diffusion bonding operation 120. As another example, at least one of the metallic materials 102, 104 may include beryllium (or a beryllium alloy), and the surface oxide layer(s) 105 include a beryllium oxide layer. In this example, a chemical reaction of the $ZrH_2$ nanoparticles 106 with the surface oxide layer(s) 105 breaks down at least a portion of the beryllium oxide layer(s), enabling migration of beryllium atoms during the diffusion bonding operation 120. As a further example, at least one of the metallic materials 102, 104 may include magnesium (or a magnesium alloy), and the surface oxide layer(s) 105 include a magnesium oxide layer. In this example, a chemical reaction of the $ZrH_2$ nanoparticles 106 with the surface oxide layer(s) 105 breaks down at least a portion of the magnesium oxide layer(s), enabling migration of magnesium atoms during the diffusion bonding operation 120.

FIG. 1 includes a callout view 142 that shows a representative example of a portion of the diffusion-bonded metallic material 140 (that depicts the migration of the metal atoms during the diffusion bonding operation 120). In the callout view 142, the metal atoms are identified by the letter M, with M representing Al, Be, or Mg (depending on the composition of the metallic materials 102, 104). The diffusion-bonded metallic material 140 may have a diffusion bond region with a thickness in a range of 1 nm to 100 nm. While not shown in the callout view 142 of FIG. 1, the diffusion bond region may include zirconium oxide ($ZrO_2$) and the diffused metal atoms (e.g., Al, Be, or Mg atoms). Thus, while the callout view of FIG. 1 depicts the diffusion of the metal (M) atoms, it will be appreciated that the diffusion bonded metallic material 140 also includes the zirconium oxide byproduct of the chemical reaction of the $ZrH_2$ nanoparticles 106 and the metallic surface oxides (with the $H_2$ byproduct off-gassed during the diffusion bonding operation 120).

In some cases, after disposing the $ZrH_2$ nanoparticles 106 on the first metallic material 102 (or both the metallic materials 102, 104), one or more additional operations may be performed to enhance bonding between the two metallic materials 102, 104. The additional operation(s) may apply energy to at least a portion of the first metallic material 102 and a portion of the second metallic material 104 to increase atomic mobility. Illustrative examples of energy application may include using at least one ultrasonic waveform source, using at least one laser light source, peening at least one of the first metallic material 102 or the second metallic material 104, or using cavitation of a fluid (among other alternatives). In some cases, the energy may be applied during or after the diffusion bonding operation 120.

Thus, FIG. 1 illustrates an example of a process of forming a diffusion-bonded metallic material. In FIG. 1, $ZrH_2$ nanoparticles that are disposed between two metallic materials (e.g., Al, Be, or Mg sheets) chemically react with surface oxide layer(s) to break down the surface oxide layer(s) in order to enable diffusion of metal atoms between the metallic materials. In some cases, the diffusion-bonded metallic material formed according to the process depicted in FIG. 1 may be used as a component of a vehicle (e.g., an aircraft or an automobile), among other alternatives.

Figure 2:
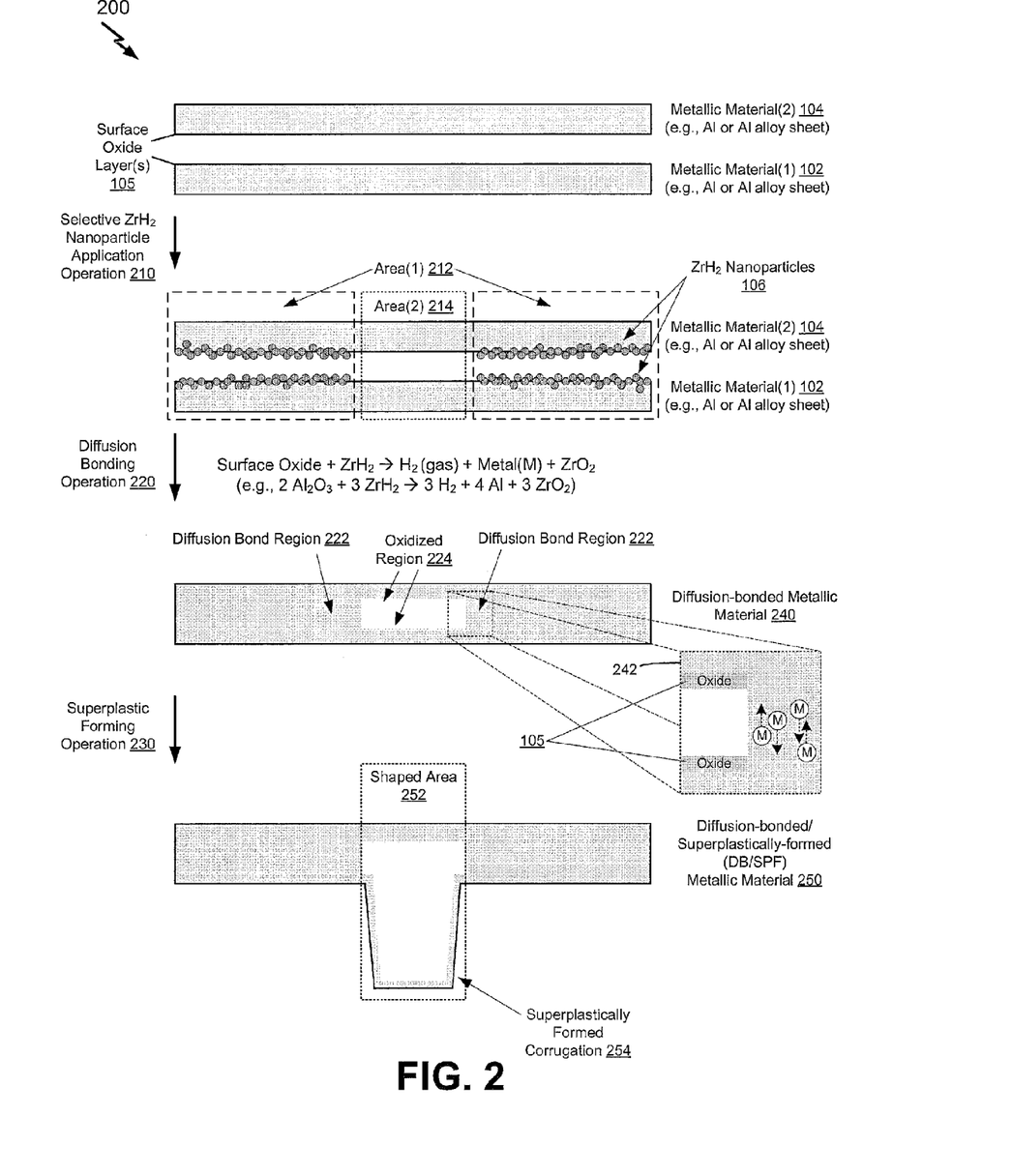
FIG. 2 is a diagram illustrating a process of forming a diffusion-bonded/superplastically-formed (DB/SPF) metallic material, according to one embodiment.

Referring to FIG. 2, a diagram 200 illustrates a particular embodiment of a process of forming a diffusion-bonded/superplastically-formed (DB/SPF) metallic material 250. FIG. 2 illustrates that the $ZrH_2$ nanoparticles 106 may be selectively applied to particular area(s) of the metallic material(s) 102, 104. The $ZrH_2$ nanoparticles 106 chemically react with surface oxide layer(s) 105 on one or both of the metallic materials 102, 104 in order to enable diffusion of metal atoms between the metallic materials 102, 104. FIG. 2 further illustrates that area(s) where the $ZrH_2$ nanoparticles 106 are not applied may be shaped via a superplastic forming operation.

FIG. 2 illustrates an example of a selective $ZrH_2$ nanoparticle application operation 210 in which the $ZrH_2$ nanoparticles 106 are applied to a first area 212 between the two metallic materials 102, 104. In the example of FIG. 2, the $ZrH_2$ nanoparticles 106 are coated or applied on surfaces of both the first metallic material 102 and the second metallic material 104. In other cases, the $ZrH_2$ nanoparticles 106 may be selectively applied to a single one of the metallic materials 102, 104. In either case, FIG. 2 illustrates that the selective $ZrH_2$ nanoparticle application operation 210 results in the $ZrH_2$ nanoparticles 106 being disposed in the first area 212 between the two metallic materials 102, 104. In a particular embodiment, the metallic materials 102, 104 include aluminum or aluminum alloy sheets, and the selective $ZrH_2$ nanoparticle application operation 210 includes disposing an aluminum alloy powder that includes the $ZrH_2$ nanoparticles 106 on the first metallic material 102 (and optionally the second metallic material 104). In the example of FIG. 2, the $ZrH_2$ nanoparticles 106 are not applied to a second area 214 between the two metallic materials 102, 104 as part of the selective $ZrH_2$ nanoparticle application operation 210.

A diffusion bonding operation 220 may be performed after the selective $ZrH_2$ nanoparticle application operation 210. At least one of the first metallic material 102 or the second metallic material 104 includes the surface oxide layer 105, and chemical reaction of the $ZrH_2$ nanoparticles 106 with the surface oxide layer(s) 105 breaks down at least portions of the surface oxide layer(s) 105, enabling migration of metal atoms during the diffusion bonding operation 220. As described further herein, in some cases, the metallic materials 102, 104 may include aluminum (or an aluminum alloy), beryllium (or a beryllium alloy), or magnesium (or a magnesium alloy), among other alternatives. In some cases, the metallic materials 102, 104 may include different metals. As an illustrative, non-limiting example, one of the metallic materials 102, 104 may be an aluminum-containing material and one of the metallic materials 102, 104 may be an iron-containing material, such as steel (among other alternatives). As illustrated in FIG. 2, the diffusion bonding operation 220 results in formation of a diffusion-bonded metallic material 240, having diffusion bond region(s) 222 corresponding to the first area 212 and oxidized region(s) 224 corresponding to the second area 214.

The diffusion bond region(s) 222 include zirconium oxide and diffused metal atoms from the two metallic materials 102, 104. The oxidized region(s) 224 include metallic oxides of the two metallic materials 102, 104. As the $ZrH_2$, nanoparticles 106 are not applied to the second area 214 during the selective $ZrH_2$ nanoparticle application operation 210, the oxidized region(s) 224 do not include zirconium oxide. The diffusion bond region(s) 222 may have a thickness in a range of 1 nm to 100 nm.

FIG. 2 depicts a non-limiting illustrative example in which at least one of the metallic materials 102, 104 includes aluminum (or an aluminum alloy), and the surface oxide layer(s) 105 include an aluminum oxide layer. In this example, a chemical reaction of the $ZrH_2$ nanoparticles 106 with the surface oxide layer(s) 105 breaks down at least a portion of the aluminum oxide layer(s), enabling migration of aluminum atoms during the diffusion bonding operation 220. As another example, at least one of the metallic materials 102, 104 may include beryllium (or a beryllium alloy), and the surface oxide layer(s) 105 include a beryllium oxide layer. In this example, a chemical reaction of the $ZrH_2$ nanoparticles 106 with the surface oxide layer(s) 105 breaks down at least a portion of the beryllium oxide layer(s), enabling migration of beryllium atoms during the diffusion bonding operation 220. As a further example, at least one of the metallic materials 102, 104 may include magnesium (or a magnesium alloy), and the surface oxide layer(s) 105 include a magnesium oxide layer. In this example, a chemical reaction of the $ZrH_2$ nanoparticles 106 with the surface oxide layer(s) 105 breaks down at least a portion of the magnesium oxide layer(s), enabling migration of magnesium atoms during the diffusion bonding operation 220.

FIG. 2 includes a callout view 242 that shows a representative example of a portion of the diffusion-bonded metallic material 240 (that depicts the migration of the metal atoms during the diffusion bonding operation 220). In the callout view 242, the metal atoms are identified by the letter M, with M representing Al, Be, or Mg (depending on the composition of the metallic materials 102, 104). While not shown in the callout view 242 of FIG. 2, the diffusion bond region(s) 222 may include zirconium oxide ($ZrO_2$) and the diffused metal atoms (e.g., Al, Be, or Mg atoms). Thus, while the callout view 242 of FIG. 2 depicts the diffusion of the metal (M) atoms, it will be appreciated that the diffusion bonded metallic material 240 also includes the zirconium oxide byproduct of the chemical reaction of the $ZrH_2$ nanoparticles 106 and the metallic surface oxides (with the $H_2$ byproduct off-gassed during the diffusion bonding operation 220).

In some cases, after disposing the $ZrH_2$ nanoparticles 106 on the first metallic material 102 (or both the metallic materials 102, 104), one or more additional operations may be performed to enhance bonding between the two metallic materials 102, 104. The additional operation(s) may include applying energy to at least a portion of the first metallic material 102 and a portion of the second metallic material 104 to increase atomic mobility. Illustrative examples of energy application may include using at least one ultrasonic waveform source, using at least one laser light source, peening at least one of the first metallic material or the second metallic material, or using cavitation of a fluid (among other alternatives). In some cases, the energy may be applied during or after the diffusion bonding operation 220.

In the particular embodiment illustrated in FIG. 2, the process further includes performing a superplastic forming operation 230. The superplastic forming operation 230 is used to shape the second area 214 of the first metallic material 102 after the diffusion bonding operation 220. The second area 214 corresponds to the oxidized region 224 where the $ZrH_2$ nanoparticles 106 were not applied to the first metallic material 102 during the selective $ZrH_2$ nanoparticle application operation 210. FIG. 2 illustrates that the superplastic forming operation 230 may result in formation of a shaped area 252 that includes a superplastically formed corrugation 254 (where the oxidized region 224 depicted in the diffusion-bonded metallic material 240 corresponds to the superplastically formed corrugation 254 depicted in the DB/SPF metallic material 250).

Thus, FIG. 2 illustrates an example of a process of forming a diffusion-bonded/superplastically-formed (DB/SPF) metallic material. In FIG. 2, $ZrH_2$ nanoparticles that are selectively applied to surface(s) of two metallic materials (e.g., Al, Be, or Mg sheets) chemically react with surface oxide layer(s) in order to enable diffusion of metal atoms between the metallic materials. FIG. 2 illustrates that region(s) where the $ZrH_2$ nanoparticles are not applied may be shaped to form superplastically-formed feature(s). In some cases, the DB/SPF metallic material formed according to the process depicted in FIG. 2 may be used as a component of a vehicle (e.g., an aircraft or an automobile), among other alternatives.

Figure 3:
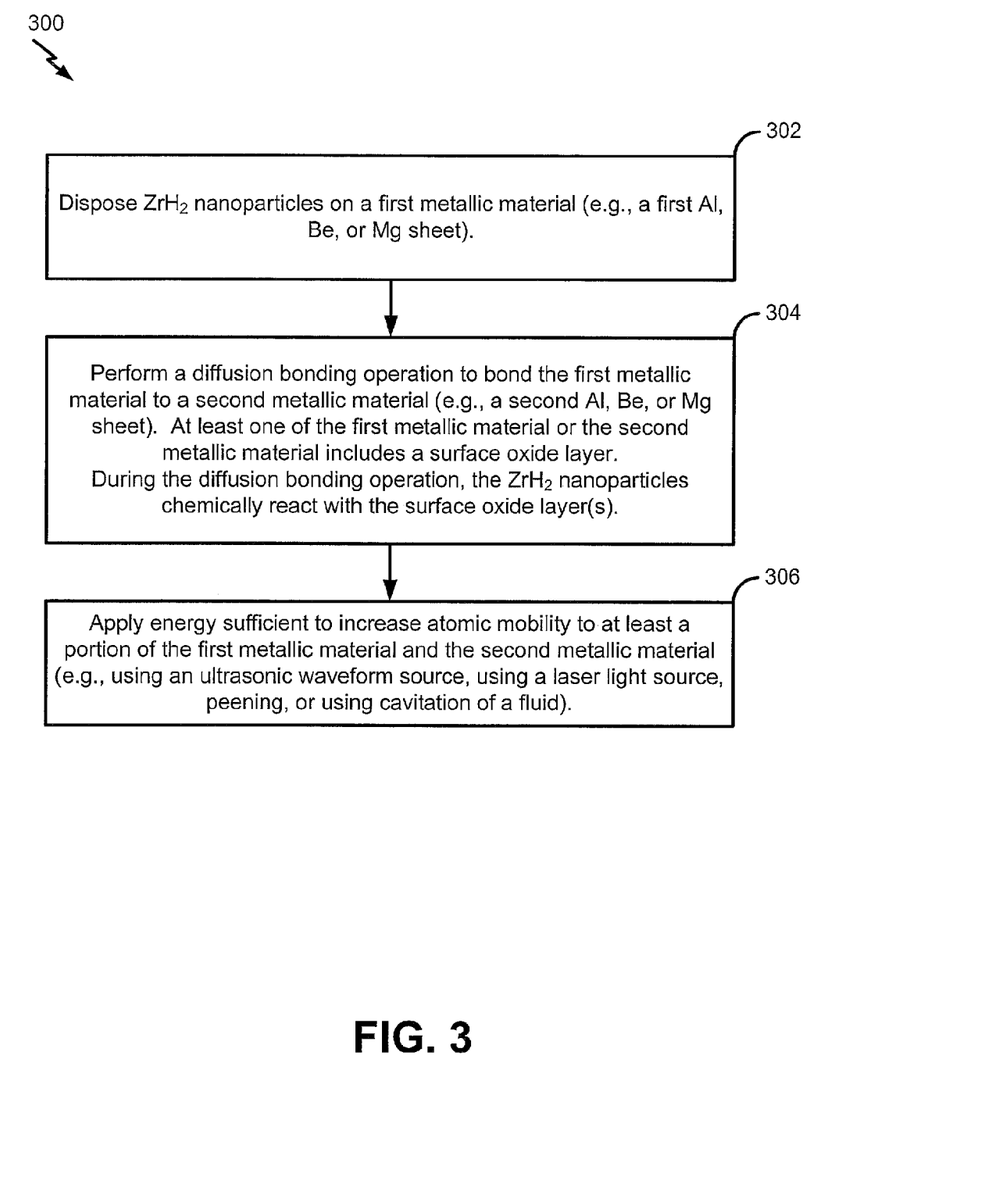
FIG. 3 is a flow chart illustrating a particular embodiment of a method of a process of forming a diffusion-bonded metallic material.

Referring to FIG. 3, a flow diagram illustrates a particular embodiment of a process 300 of forming a diffusion-bonded metallic material. In some cases, the process 300 of FIG. 3 may be used to form the diffusion-bonded metallic material 140 of FIG. 1. FIG. 3 illustrates that, in some cases, energy may be applied during or after a diffusion bonding operation to increase atomic mobility of atoms of metallic material(s), in order to further enhance bond strength at diffusion-bonded location(s).

The process 300 includes disposing $ZrH_2$ nanoparticles on a first metallic material, at 302. For example, referring to FIG. 1, the $ZrH_2$ nanoparticle application operation 110 includes disposing the $ZrH_2$ nanoparticles 106 on the first metallic material 102 (e.g., cold spraying the $ZrH_2$ nanoparticles 106 onto the first metallic material 102). In the particular embodiment illustrated in FIG. 1, the $ZrH_2$ nanoparticle application operation 110 also includes disposing the $ZrH_2$ nanoparticles 106 on the second metallic material 104 (e.g., cold spraying the $ZrH_2$ nanoparticles 106 onto the second metallic material 104).

The process 300 includes performing a diffusion bonding operation to bond the first metallic material to a second metallic material, at 304. For example, referring to FIG. 1, the diffusion bonding operation 120 may be performed to bond the first metallic material 102 to the second metallic material 104. As depicted in the callout view 142 of FIG. 1, a chemical reaction of the $ZrH_2$ nanoparticles 106 with the surface oxide layer(s) 105 (e.g., an aluminum oxide layer, a beryllium oxide layer, or a magnesium oxide layer) of one or more of the metallic materials 102, 104 substantially breaks down the surface oxide layer(s) 105, enabling migration of metal (M) atoms during the diffusion bonding operation 120.

In the particular embodiment illustrated in FIG. 3, the process 300 also includes applying energy sufficient to increase atomic mobility to at least a portion of the first metallic material and a portion of the second metallic material, at 306. For example, referring to FIG. 1, after disposing the $ZrH_2$ nanoparticles 106 on the first metallic material 102 (or both of the metallic materials 102, 104), one or more additional operations may be performed to enhance bonding between the two metallic materials 102, 104. The additional operation(s) may include applying energy sufficient to increase atomic mobility to at least a portion of the first metallic material 102 and a portion of the second metallic material 104. Illustrative examples of energy application may include applying ultrasonic waves using at least one ultrasonic waveform source, applying laser light using at least one laser light source, peening at least one of the first metallic material or the second metallic material, or using cavitation of a fluid (among other alternatives). In some cases, the energy may be applied during or after the diffusion bonding operation 120.

Thus, FIG. 3 illustrates an example of a process of forming a diffusion-bonded metallic material. In the example of FIG. 3, $ZrH_2$ nanoparticles that are disposed between two metallic materials (e.g., Al, Be, or Mg sheets) chemically react with surface oxide layer(s) to break down at least a portion of the surface oxide layer(s) in order to enable diffusion of metal atoms between the metallic materials.

Figure 4:
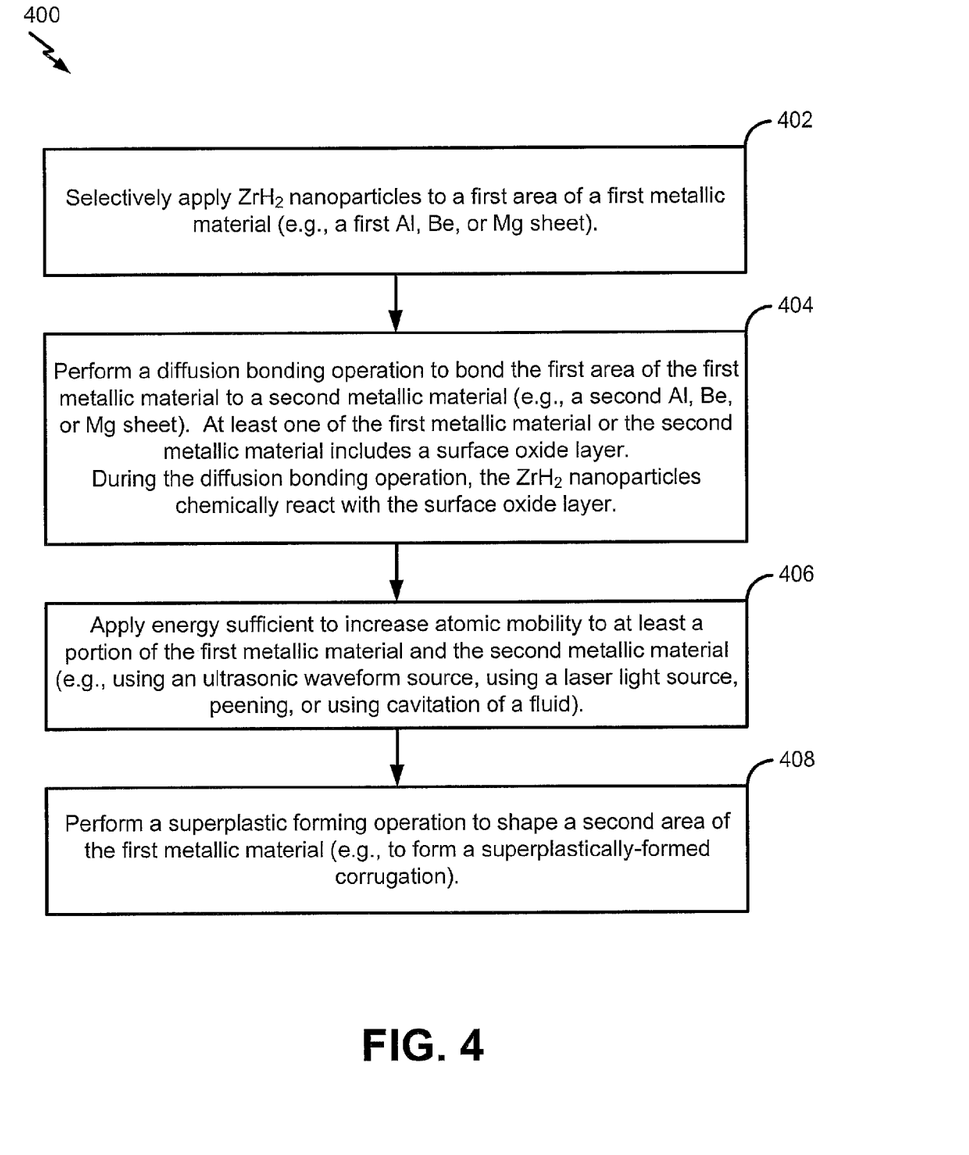
FIG. 4 is a flow chart illustrating a particular embodiment of a method of a process of forming a DB/SPF metallic material.

Referring to FIG. 4, a flow diagram illustrates a particular embodiment of a process 400 of forming a diffusion-bonded/superplastically-formed (DB/SPF) metallic material. In some cases, the process 400 of FIG. 4 may be used to form the DB/SPF metallic material 250 of FIG. 2.

The process 400 includes selectively applying $ZrH_2$ nanoparticles to a first area of a first metallic material, at 402. For example, referring to FIG. 2, the selective $ZrH_2$ nanoparticle application operation 210 includes disposing the $ZrH_2$ nanoparticles 106 on the first area 214 of the first metallic material 102 (e.g., cold spraying the $ZrH_2$ nanoparticles 106 onto the first area 214 of the first metallic material 102). In the particular embodiment illustrated in FIG. 2, the selective $ZrH_2$ nanoparticle application operation 210 also includes disposing the $ZrH_2$ nanoparticles 106 on the first area 212 of the second metallic material 104 (e.g., cold spraying the $ZrH_2$ nanoparticles 106 onto the first area 212 of the second metallic material 104).

The process 400 includes performing a diffusion bonding operation to bond the first area of the first metallic material to a second metallic material, at 404. For example, referring to FIG. 2, the diffusion bonding operation 220 may be performed to bond the first area 212 of the first metallic material 102 to the second metallic material 104. As depicted in the callout view 242 of FIG. 2, a chemical reaction of the $ZrH_2$ nanoparticles 106 with the surface oxide layer(s) 105 (e.g., an aluminum oxide layer, a beryllium oxide layer, or a magnesium oxide layer) of one or more of the metallic materials 102, 104 breaks down at least a portion of the surface oxide layer(s) 105, enabling migration of metal (M) atoms during the diffusion bonding operation 220.

In the particular embodiment illustrated in FIG. 4, the process 400 also includes applying energy sufficient to increase atomic mobility to at least a portion of the first metallic material and a portion of the second metallic material, at 406. For example, referring to FIG. 2, after disposing the $ZrH_2$ nanoparticles 106 on the first metallic material 102 (or both of the metallic materials 102, 104), one or more additional operations may be performed to enhance bonding between the two metallic materials 102, 104. The additional operation(s) may include applying energy sufficient to increase atomic mobility to at least a portion of the first metallic material 102 and a portion of the second metallic material 104. Illustrative examples of energy application may include using at least one ultrasonic waveform source, using at least one laser light source, peening at least one of the first metallic material or the second metallic material, or using cavitation of a fluid (among other alternatives). In some cases, the energy may be applied during or after the diffusion bonding operation 220.

In the particular embodiment illustrated in FIG. 4, the process 400 further includes performing a superplastic forming operation to shape an area of the first metallic material, at 408. For example, referring to FIG. 2, the superplastic forming operation 230 may be performed to shape the second area 214 (where the $ZrH_2$ nanoparticles 106 are not applied during the selective $ZrH_2$ nanoparticle application operation 210) to form the shaped area 252. As shown in the example of FIG. 2, the shaped area 252 may include the superplastically formed corrugation 254.

Thus, FIG. 4 illustrates an example of a process of forming a DB/SPF metallic material. In the example of FIG. 4, $ZrH_2$ nanoparticles that are selectively applied to a first area disposed between two metallic materials (e.g., Al, Be, or Mg sheets) chemically react with surface oxide layer(s) in order to enable diffusion of metal atoms in the first area between the metallic materials. In a second area where the $ZrH_2$ nanoparticles are not applied, a superplastic forming operation may be performed to shape the second area (e.g., to form a superplastically-formed corrugation).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it is to be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
   disposing $ZrH_2$ nanoparticles on a first metallic material; and
   performing a diffusion bonding operation to bond the first metallic material to a second metallic material forming a diffusion bond region,
   wherein at least one of the first metallic material or the second metallic material includes a surface oxide layer, and
   wherein, during the diffusion bonding operation, the $ZrH_2$ nanoparticles chemically react with the surface oxide layer.

2. The method of claim 1, further comprising performing a superplastic forming operation after performing the diffusion bonding operation.

3. The method of claim 1, wherein disposing the $ZrH_2$ nanoparticles on the first metallic material includes disposing a metallic powder on the first metallic material, wherein the metallic powder includes the $ZrH_2$ nanoparticles.

4. The method of claim 3, wherein the metallic powder includes an aluminum powder or an aluminum alloy powder.

5. The method of claim 1, wherein at least one of the first metallic material or the second metallic material includes aluminum, wherein the surface oxide layer includes an aluminum oxide layer, and wherein chemical reaction of $ZrH_2$ nanoparticles with the surface oxide layer breaks down at least a portion of the aluminum oxide layer enabling migration of aluminum atoms during the diffusion bonding operation.

6. The method of claim 1, wherein at least one of the first metallic material or the second metallic material includes beryllium, wherein the surface oxide layer includes a beryllium oxide layer, and wherein chemical reaction of $ZrH_2$ nanoparticles with the surface oxide layer breaks down at least a portion of the beryllium oxide layer enabling migration of beryllium atoms during the diffusion bonding operation.

7. The method of claim 1, wherein at least one of the first metallic material or the second metallic material includes magnesium, wherein the surface oxide layer includes a magnesium oxide layer, and wherein chemical reaction of $ZrH_2$ nanoparticles with the surface oxide layer breaks down at least a portion of the magnesium oxide layer enabling migration of magnesium atoms during the diffusion bonding operation.

8. The method of claim 1, further comprising, after disposing the $ZrH_2$ nanoparticles on the first metallic material, applying energy sufficient to increase atomic mobility to at least a portion of the first metallic material and a portion of the second metallic material.

9. The method of claim 8, wherein applying the energy includes:
   using at least one ultrasonic waveform source;
   using at least one laser light source;
   peening at least one of the first metallic material or the second metallic material; or
   using cavitation of a fluid.

10. The method of claim 8, wherein the energy is applied during or after the diffusion bonding operation.

11. The method of claim 1, wherein disposing the $ZrH_2$ nanoparticles on the first metallic material includes selectively applying the $ZrH_2$ nanoparticles to a first area of the first metallic material.

12. The method of claim 11, further comprising performing a superplastic forming operation to shape a second area of the first metallic material after the diffusion bonding operation, wherein the second area corresponds to an oxidized region that includes metallic oxides of at least one of the first metallic material or the second metallic material, wherein the oxidized region does not include zirconium oxide, and wherein the $ZrH_2$ nanoparticles were not applied to the second area during selective application of the $ZrH_2$ nanoparticles.

13. A diffusion-bonded metallic material formed by the method of claim 1, the diffusion-bonded metallic material comprising an oxidized region corresponding to the surface oxide layer and disposed between the first metallic material and the second metallic material, where the oxidized region includes metallic oxides of at least one of the first metallic material or the second metallic material, and wherein the oxidized region does not include zirconium oxide.

14. The diffusion-bonded metallic material of claim 13, wherein the method further comprises performing a superplastic forming operation after performing the diffusion bonding operation, wherein performing the superplastic forming operation shapes an oxidized region, and wherein the oxidized region includes metallic oxides of at least one of the first metallic material or the second metallic material, and wherein the oxidized region does not include zirconium oxide.

15. A diffusion-bonded metallic material, comprising:
   two metallic materials;
   a diffusion bond region disposed between the two metallic materials, the diffusion bond region including a reaction byproduct of $ZrH_2$ and a metal surface oxide layer and diffused metal atoms from the two metallic materials; and an oxidized region corresponding to the metal surface oxide layer and disposed between the two metallic materials, wherein the oxidized region includes metallic oxides of at least one of the two metallic materials, and wherein the oxidized region does not include zirconium oxide.

16. The diffusion-bonded metallic material of claim 15, wherein the oxidized region corresponds to a superplastically formed corrugation.

17. The diffusion-bonded metallic material of claim 15, wherein the two metallic materials have different metallic compositions.

18. The diffusion-bonded metallic material of claim 15, wherein the diffusion bond region has a thickness in range of 1 nm to 100 nm.

19. A vehicle comprising the diffusion-bonded metallic material of claim 15.

20. The vehicle of claim 19, wherein the vehicle includes a space vehicle, a water vehicle, an underwater vehicle, or a ground vehicle.

* * * * *